United States Patent
Deng et al.

(10) Patent No.: US 10,031,764 B2
(45) Date of Patent: Jul. 24, 2018

(54) MANAGING EXECUTABLE FILES

(71) Applicant: INTERNATIONAL BUSINESS MACHINES CORORATION, Armonk, NY (US)

(72) Inventors: Jian Gang Deng, Beijing (CN); DaFei Shi, Beijing (CN); Lijun Wei, Beijing (CN); Gong Zhe, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 14/869,333

(22) Filed: Sep. 29, 2015

(65) Prior Publication Data

US 2016/0092206 A1 Mar. 31, 2016

(30) Foreign Application Priority Data

Sep. 30, 2014 (CN) .......................... 2014 1 0521742

(51) Int. Cl.
 *G06F 9/44* (2018.01)
 *G06F 9/445* (2018.01)
(52) U.S. Cl.
 CPC .................................. *G06F 9/445* (2013.01)
(58) Field of Classification Search
 CPC ....................................................... G06F 9/44
 USPC ................................................. 717/120–123
 See application file for complete search history.

(56) References Cited

U.S. PATENT DOCUMENTS

| | | | | |
|---|---|---|---|---|
| 4,389,706 A | * | 6/1983 | Gomola | G05B 15/02 700/1 |
| 5,734,822 A | * | 3/1998 | Houha | G06F 9/44521 375/E7.024 |
| 5,812,828 A | * | 9/1998 | Kaufer | G06F 9/45504 703/22 |
| 5,822,787 A | * | 10/1998 | Zucker | G06F 9/44521 711/213 |
| 6,460,178 B1 | * | 10/2002 | Chan | G06F 9/44521 717/116 |
| 6,691,305 B1 | | 2/2004 | Henkel et al. | |
| 6,883,087 B1 | | 4/2005 | Raynaud-Richard et al. | |
| 6,952,820 B1 | | 10/2005 | Schultz et al. | |

(Continued)

FOREIGN PATENT DOCUMENTS

EP 1749266 B1 10/2013

OTHER PUBLICATIONS

Gilbert, John et al., "Adaptive Object Code Compression," CASES '06 Proceedings of the 2006 International Conference on Compilers, Architecture and Synthesis for Embedded Systems, Oct. 23, 2006, pp. 282-292.

(Continued)

*Primary Examiner* — Jae Jeon
(74) *Attorney, Agent, or Firm* — Helsin Rothenberg Farley & Mesiti P.C.

(57) ABSTRACT

Executable files are managed. A determination is made as to whether in a second executable file there exists a function that is the same as a function called in a first executable file. A data package is generated on a portion other than the function in the first executable file and the second executable file, and the function is stored in relation to the data package. The data package includes a first address of the function in the first executable file and a second address of the function in the second executable file.

19 Claims, 10 Drawing Sheets

(56) References Cited

U.S. PATENT DOCUMENTS

| | | | |
|---|---|---|---|
| 7,305,541 B2 | 12/2007 | Kirovski et al. | |
| 7,688,232 B2 | 3/2010 | Lim et al. | |
| 7,779,027 B2* | 8/2010 | James | G06F 9/44526 707/769 |
| 9,081,896 B1* | 7/2015 | Efremov | G06F 11/3664 |
| 2004/0111720 A1* | 6/2004 | Vertes | G06F 9/4486 717/164 |
| 2005/0055633 A1* | 3/2005 | Ali | G06F 8/38 715/236 |
| 2006/0136907 A1* | 6/2006 | Bennett | G06F 8/61 717/174 |
| 2008/0005728 A1* | 1/2008 | Morris | G06F 8/52 717/153 |
| 2008/0127170 A1* | 5/2008 | Goldman | G06F 8/61 717/174 |
| 2009/0271446 A1* | 10/2009 | Depreter | G06F 17/30362 |
| 2012/0317564 A1* | 12/2012 | Lee | G06F 8/61 717/175 |
| 2013/0132710 A1 | 5/2013 | Coulon et al. | |
| 2015/0007165 A1* | 1/2015 | Zhao | G06F 8/61 717/174 |
| 2015/0033320 A1* | 1/2015 | Liang | G06F 21/50 726/11 |

OTHER PUBLICATIONS

Yang, Joon-Sung et al., "Utilizing ATE Vector Repeat with Linear Decompressor for Test Vector Compression," IEEE Transactions on Computer-Aided Design of Integrated Circuits and Systems, vol. 33, No. 8, Aug. 2014, pp. 1219-1230.

* cited by examiner

410 First Executable File

420 Second Executable File

416 First Address

426 Second Address

MANAGING EXECUTABLE FILES

PRIOR FOREIGN APPLICATION

This application claims priority from Chinese patent application number 201410521742.9, filed Sep. 30, 2014, which is hereby incorporated herein by reference in its entirety.

BACKGROUND

Various embodiments of the present invention relate to file management, and more specifically, to managing executable files.

With the development of computer software, there have been developed various technical solutions for data file compression. For example, a very high data compression ratio can be provided with respect to text files (for example, higher than 90%, which indicates the size of a compressed file is 10% of the size of an original file). Compression ratios of various data compression methods for different formats of files are different. For example, when compressing a text file, the compression ratio might be 90% or above; however, when compressing an executable file using the same compression algorithm, there might not be much difference between the size of a compressed file and the size of an original file, and even the compressed file is larger than the original file.

An application may comprise one or more executable files; the executable file is usually presented in binary form and can hardly be compressed using a conventional data compression algorithm. Since the executable file might occupy a large storage space, a provider of the application (such as a provider providing application downloading services specially) has to continuously expand the storage capacity of a server so as to store ever-increasing applications.

With the development of cloud computing environments, there are a large amount of executable files in a server under the cloud computing environment. Hence, how to manage these executable files becomes a challenge. In addition to the cloud computing environment, an embedded system is usually used for dedicated devices and only has quite limited storage resources. Moreover, the embedded system is typically a closed system and is not easy to be expanded like a general-purpose computer system. Therefore, in the embedded system, demands on the size of executable files are rather strict, and it is desired that a compressed version of the executable file can be stored in the embedded system and is decompressed when the executable file needs to be run.

Although the prior art has proposed technical solutions for data compression/decompression, these technical solutions are not suitable to compress/decompress executable files. Therefore, there is a problem as to how to effectively manage a plurality of executable files so as to reduce the storage space occupied by the plurality of executable files.

SUMMARY

Therefore, it is desired to develop a technical solution capable of managing a plurality of executable files (especially a large amount of executable files) more effectively. It is desired that the technical solution can re-organize data in a plurality of executable files so as to store these executable files in a smaller storage space, and further can increase the efficiency of transmitting these executable files.

In one aspect, a method of managing executable files is provided. The method includes determining, by a processor, that there exists a function that is a same function in a first executable file and a second executable file; generating a data package on a portion other than the function in the first executable file and the second executable file wherein the data package comprises a first address of the function in the first executable file and a second address of the function in the second executable file; and storing the function in relation to the data package.

In another aspect, a computer system for managing executable files is provided. The computer system includes a memory; and a processor in communication with the memory, wherein the computer system is configured to perform a method. The method includes determining, by the processor, that there exists a function that is a same function in a first executable file and a second executable file; generating a data package on a portion other than the function in the first executable file and the second executable file, wherein the data package comprises a first address of the function in the first executable file and a second address of the function in the second executable file; and storing the function in relation to the data package.

In yet another aspect, a computer program product for managing executable files is provided. The computer program product includes a computer readable storage medium readable by a processing circuit and storing instructions for execution by the processing circuit for performing a method. The method includes determining, by a processor, that there exists a function that is a same function in a first executable file and a second executable file; generating a data package on a portion other than the function in the first executable file and the second executable file, wherein the data package comprises a first address of the function in the first executable file and a second address of the function in the second executable file; and storing the function in relation to the data package.

BRIEF DESCRIPTION OF THE DRAWINGS

Through the more detailed description of some embodiments of the present disclosure in the accompanying drawings, the above and other objects, features and advantages of aspects of the present disclosure will become more apparent, wherein the same reference generally refers to the same components in the embodiments of the present disclosure.

DETAILED DESCRIPTION

Figure 1:
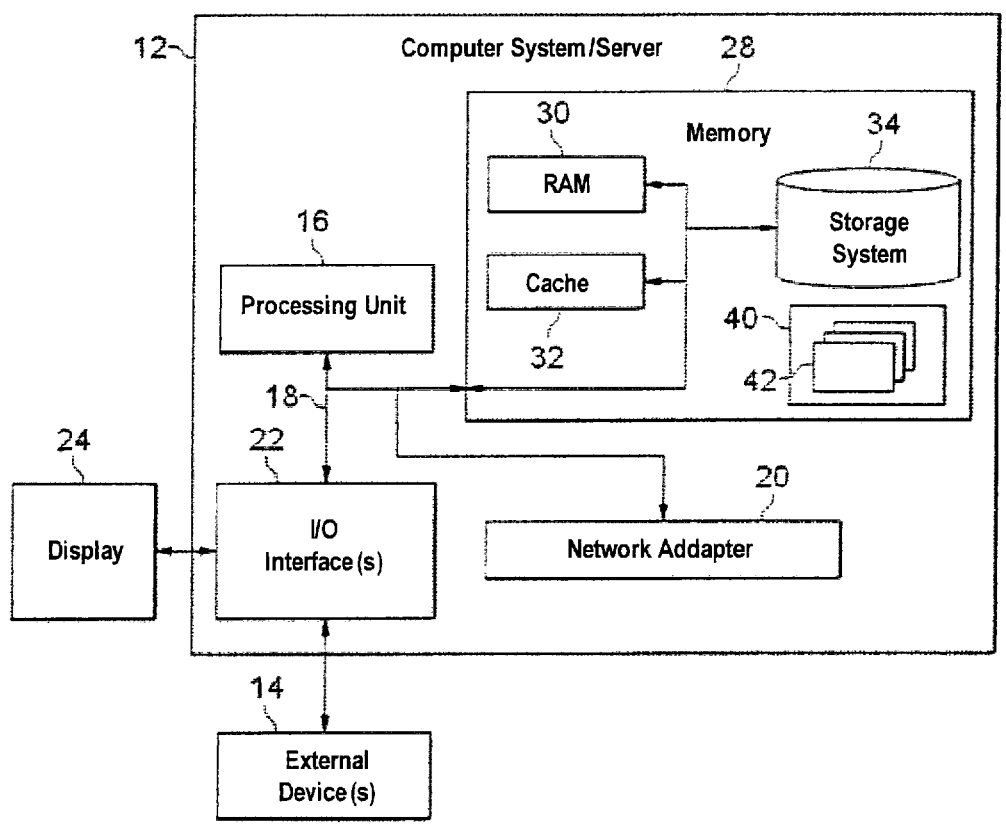
FIG. 1 schematically depicts a block diagram of one example of a computer system/server which is applicable to implement the embodiments of the present invention.

Some embodiments will be described in more detail with reference to the accompanying drawings, in which embodiments of the present disclosure have been illustrated. However, aspects of the present disclosure can be implemented in various manners, and thus should not be construed to be limited to the embodiments disclosed herein. On the contrary, those embodiments are provided for the thorough and complete understanding of aspects of the present disclosure, and completely conveying the scope of aspects of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable file instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
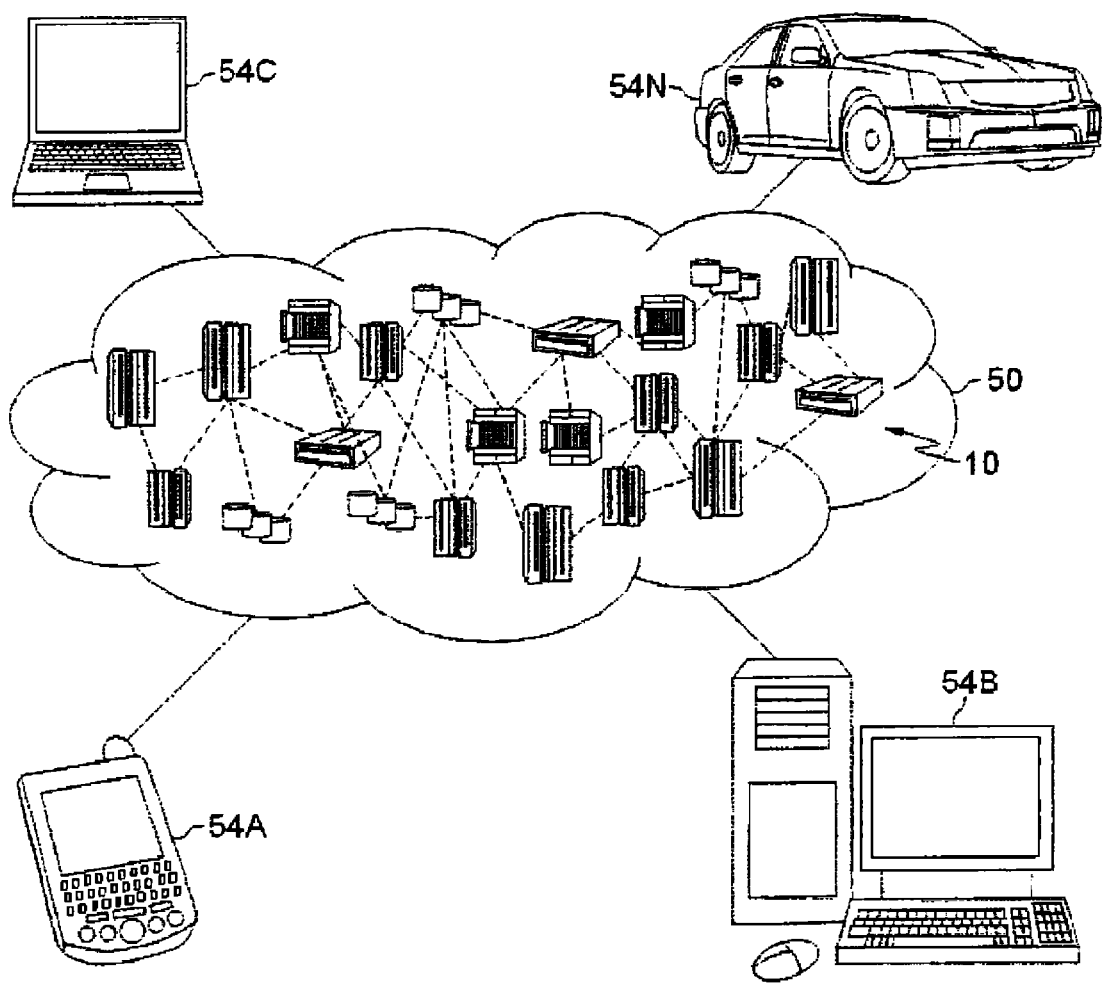
FIG. 2 schematically depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers may communicate. The local computing devices may be, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
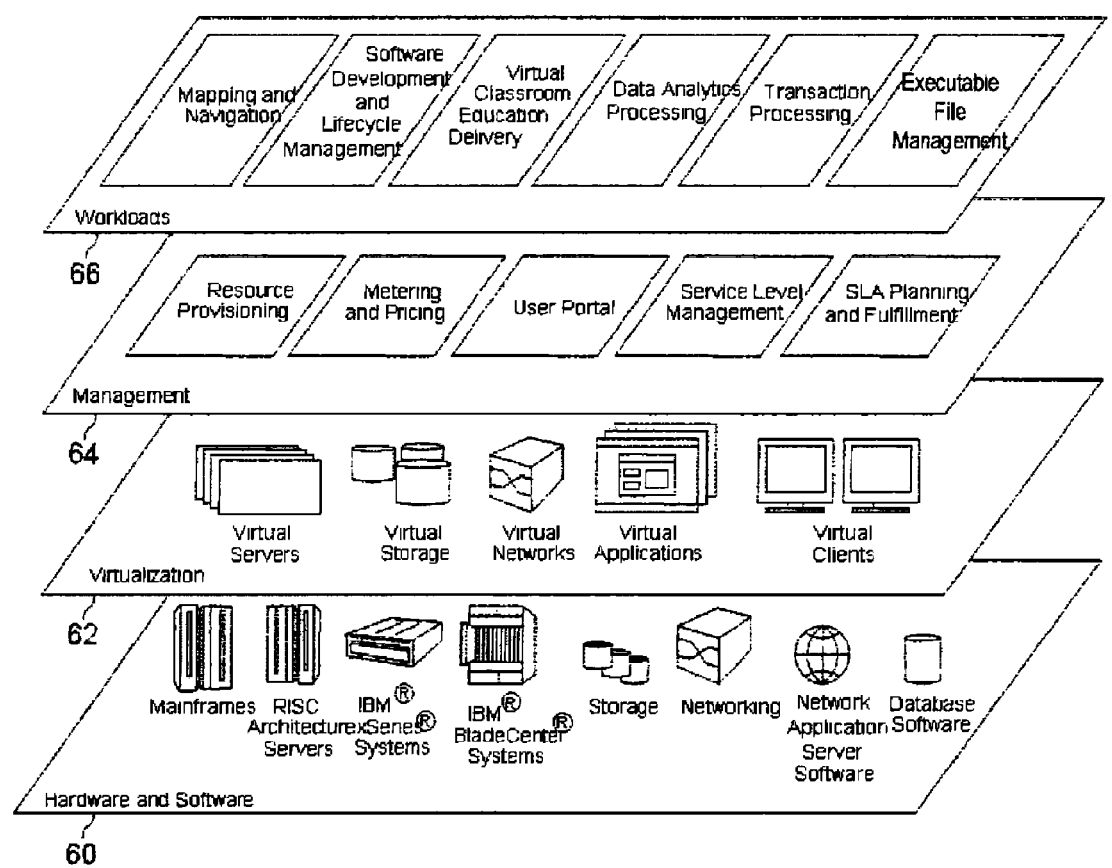
FIG. 3 schematically depicts abstraction model layers provided by cloud computing environment 50 (FIG. 2)

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes (e.g. IBM® zSeries® systems); RISC (Reduced Instruction Set Computer) architecture based servers (e.g., IBM pSeries® systems); IBM xSeries® systems; IBM BladeCenter® systems; storage devices; networks and networking components. Examples of software components include network application server software (e.g., IBM WebSphere® application server software); and database software (e.g, IBM DB2® database software). (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and executable file management.

In one embodiment of the present invention, a solution for managing executable files according to various embodiments of the present invention may be implemented at workloads layer 66, so as to conveniently provide tools for executable file management to users in a cloud computing environment and further compress and store a large amount of executable files that are hard to be compressed using the prior art. Further, an original executable file can be recovered rapidly when a compressed executable file needs to be run. An application environment of one embodiment of the present invention has been illustrated above. Those skilled in the art should understand that embodiments of aspects of the present invention may further be implemented in any other type of application environment that is known currently or to be developed later.

Those skilled in the art should understand that an executable file is usually obtained through a process as below: a developer develops an application in a programming language and then may generate an executable file through testing, compiling and building. The executable file is usually stored in binary form, and thus, can hardly be compressed by a conventional data compression method.

The executable file comprises various types of data. For example, it may comprise: a file header for marking basic information of the executable file (such as file size, operating system on which the file is based, etc.); a code section for storing the generated executable code; a symbol table for storing a data structure defined in source code, definition of a function and other information. In the executable file, the code segment usually takes a large storage space, and since what is stored in the code section is executable code, the code section can hardly be compressed.

Figure 4:
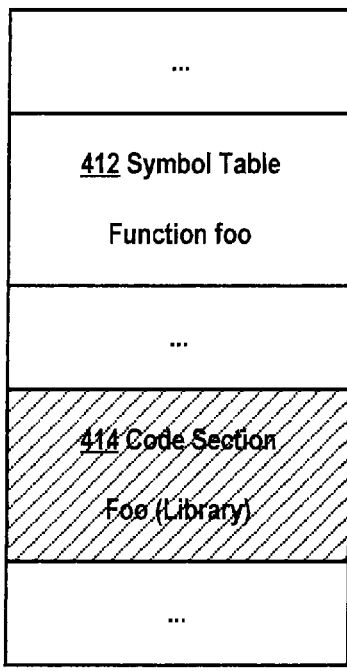
FIG. 4 schematically depicts a block diagram of a method for storing a plurality of executable files according to one technical solution.
Figure 4:
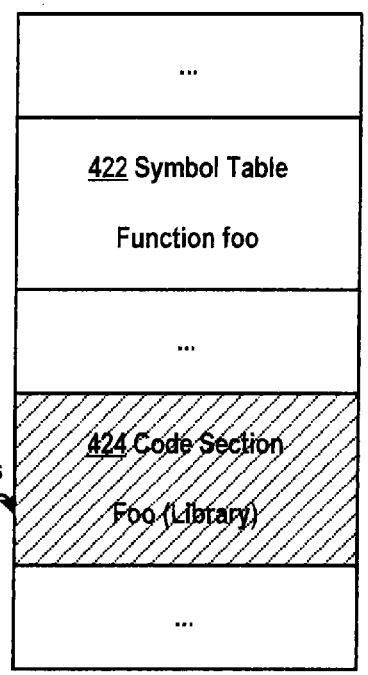

FIG. 4 schematically shows a block diagram 400 of a method for storing a plurality of executable files according to one technical solution. FIG. 4 schematically shows a first executable file 410 and a second executable file 420; for the sake of clarity, FIG. 4 only shows a symbol table and a code section of the executable file and does not show other portion of the executable file. As shown in this figure, first executable file 410 comprises a symbol table 412 and a code section 414, and symbol table 412 comprises information on a function foo and code section 414 comprises executable code that is obtained on the basis of source code of the function foo. Second executable file 420 comprises a symbol table 422 and a code section 424, and symbol table 422 also comprises information on the function foo and code section 424 comprises executable code that is obtained on the basis of source code of the function foo. The function foo shown in FIG. 4 is merely one example of a function that appears both in first executable file 410 and second executable file 420; generally, the two executable files may comprise a large amount of the same functions.

As the development of computer technology, a variety of function libraries can be provided so far. For example, taking the C language as an example, there are already a function library "time" for providing functionality associated with time and date, a function library "stdio" for providing functionality associated with basic input/output, etc.

Different software companies and/or developers may further define their own function libraries; for example, a function library associated with data displaying operations may be defined. When another software company and/or developer writes source code, the company and/or developer may directly call functions in these function libraries without re-developing code. The function library provides developers with more flexibility. Thereby, nowadays, developers will usually call functions in many function libraries during development and proceed on the basis of multiple function libraries.

When calling a function in a function library, depending on the type (dynamic library and static library) of the function library, the implementation (e.g., executable code) of the called function is included in the code section of the executable file, and the executable code will occupy a large storage space and be difficult to be compressed.

Specifically, in the example as shown in FIG. 4, if foo is a function in the function library, then the implementation of foo will be included in code sections 414 and 424, respectively. In other words, contents (portion shown in shadow) of code section 414 at a first address 416 in first executable file 410 are the same as contents (portion shown in shadow) of code section 424 at a second address 426 in second executable file 420.

Apparently, according to the technical solution shown in FIG. 4, first executable file 410 and second executable file 420 include duplicate contents. When the server has to store more (thousands of and even tens of thousands of) executable files, these duplicate contents will occupy more storage space.

In view of the above drawbacks in the prior art, it is desired to develop a technical solution capable of managing a plurality of executable files more efficiently. Specifically, in one embodiment of the present invention, there is proposed a method for managing executable files, comprising: determining that in a second executable file there exists a function that is the same as a function called by a first executable file; generating a data package on a portion other than the function in the first executable file and the second executable file; and storing the function in relation to the data packet, wherein the data package comprises a first address of the function in the first executable file and a second address of the function in the second executable file.

Figure 5:
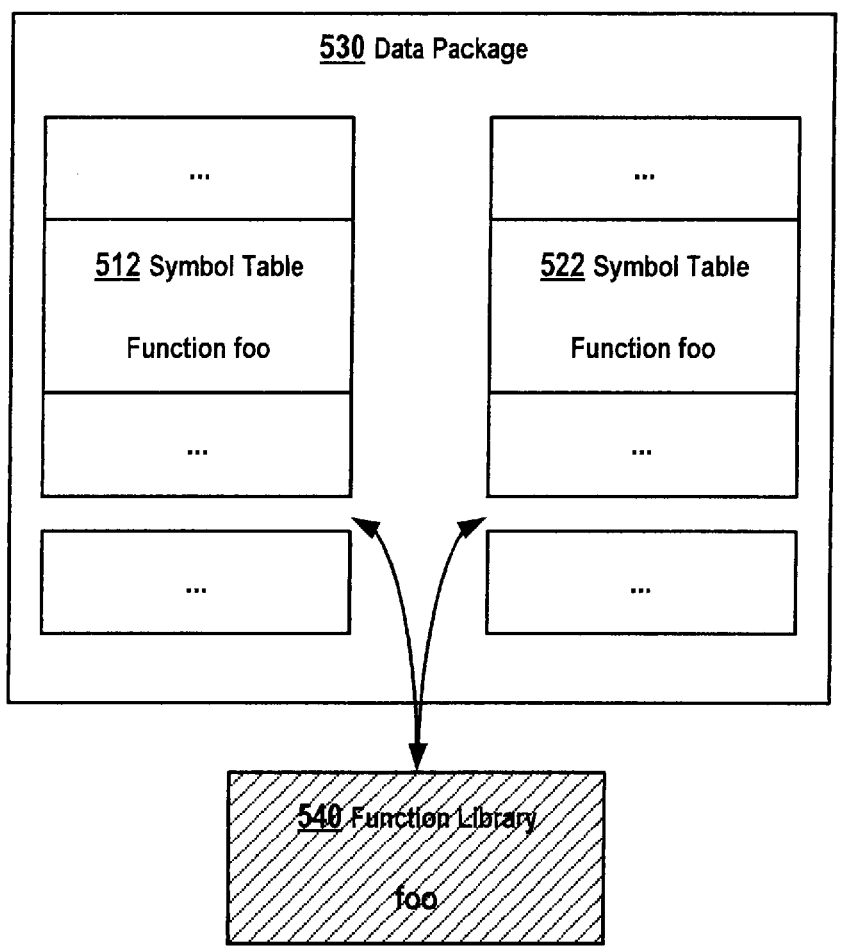
FIG. 5 schematically depicts a block diagram of a technical solution for managing executable files according to one embodiment of the present invention.

FIG. 5 schematically shows a block diagram 500 of a technical solution for managing executable files according to one embodiment of the present invention. Those skilled in the art should understand that in the context of one or more aspects of the present invention, how to manage a plurality of executable files is illustrated by means of only two executable files. According to an aspect described in the context of an aspect of the present invention, those skilled in the art may implement a technical solution of an aspect of present invention in an environment involving three or more executable files.

FIG. 5 is a schematic view of a result from processing a first executable file and a second executable file. Specifically, when it is found that both executable files include the calling of the function foo, contents related to the function foo may be removed from the code sections of the two executable files, and a data package 530 is generated on the basis of a portion other than the function foo in the first executable file and the second executable file. Subsequently, the function foo may be saved in a function library 540, and the function foo in function library 540 is stored in relation to data package 530 (for example, as shown by arrows in FIG. 5).

On the basis of the principle shown in FIG. 5, a function may be removed from a plurality of executable files calling this same function, and a copy of the function is stored in relation to a data package that is generated on the basis of the plurality of executable files. Compared with the traditional technical solution, when n executable files are involved, n copies of the function used to be stored; according to the embodiments of the present invention, however, only one copy of the function is stored. In this manner, the storage space occupied by the plurality of executable files can be saved greatly.

Figure 6:
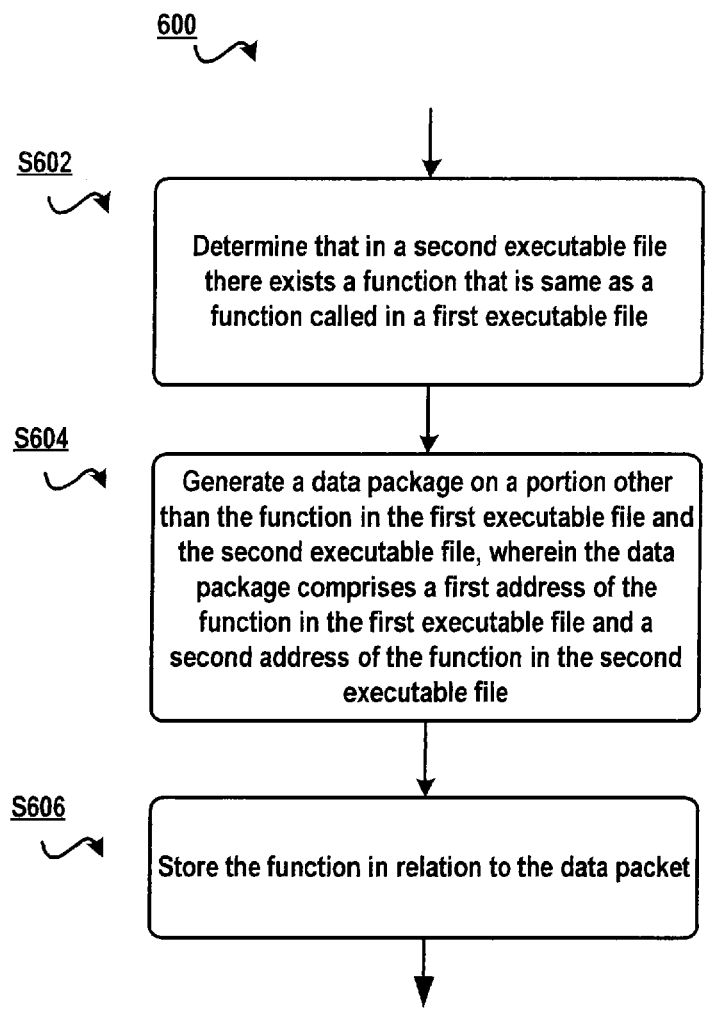
FIG. 6 schematically depicts a flowchart of a method for managing executable files according to one embodiment of the present invention.

FIG. 6 schematically shows a flowchart 600 of a method for managing executable files according to one embodiment of the present invention. Specifically, as shown in FIG. 6, in step S602 it is determined that in a second executable file there exists a function that is the same as a function called by a first executable file. For example, with respect to a function in the first executable file, the second executable file may be scanned and whether there is the same function in the second executable file is determined. Those skilled in the art should understand that although how to implement the embodiments is described by means of only one function in the context of aspects of the present invention, two executable files may further call a plurality of the same functions. At this point, the method of an aspect of the present invention only has to be executed with respect to each of the plurality of same functions.

In step S604, a data package is generated on the basis of a portion other than the function in the first executable file and the second executable file, wherein the data package comprises a first address of the function in the first executable file and a second address of the function in the second executable file. In this step, locations of the function in the first executable file and the second executable file may be recorded as a first address and a second address respectively, and a data package is generated on the basis of a portion other than the function in the first executable file and the second executable file.

The purpose of storing the first address and the second address in the data package is that after the first executable file and the second executable file are processed according to a technical solution of an aspect of the present invention, if the original first executable file and second executable file need to be recovered from the processing result, then the function stored in relation to the data package may be inserted into the first address and the second address respectively, so as to recover the first executable file and the second executable file.

In step S606, the function is stored in relation to the data package. Those skilled in the art may adopt a variety of approaches to storing the function in relation to the data package; for example, may store the function and the data package in two separate files and build an association relationship between the function and the data package.

In the embodiments of the present invention, the function and the data package are not in a one-to-one correspondence relationship. When two executable files call a plurality of the same functions (for example, two executable files call a function foo1 and a function foo2), the data package may be associated with the two functions. For another example, if a third executable file and a fourth executable file also call the function foo1, then another data package may further be generated on the basis of the third executable file and the fourth executable file, and the other data package may be associated with the function foo1. In this example, for example, the functions foo1 and foo2 may be stored in the same function library, and the data package may be associated with the functions foo1 and foo2 in the function library while the other data package may be associated with the function foo1 in the function library.

In other words, in the context of an aspect of the present invention it is not intended to limit the number of plural executable files involved in one data package, or limit how many functions one data package is associated with, or limit how many data packages one function is associated with; but there may exist a many-to-many relationship between data packages and functions.

In one embodiment of the present invention, the generating a data package on a portion other than the function in the first executable file and the second executable file comprises: removing the function from the first address of the first executable file so as to generate a first intermediate file, and removing the function from the second address of the second executable file so as to generate a second intermediate file; and generating the data package on the basis of the first intermediate file and the second intermediate file.

In this embodiment, since the first executable file and the second executable file call the same function, only one copy of the function needs to be included in the final processing result. For the sake of convenience, the function may be removed from the first executable file and the second executable file respectively (for example, code section 414 and code section 424 shown in shadow are removed respectively in the example of FIG. 4), and corresponding first intermediate file and second intermediate file are generated.

Those skilled in the art may adopt various approaches to generate the data package on the basis of the first intermediate file and the second intermediate file. One straightforward approach is to directly package the two intermediate files in one data package without performing additional compression processing to the two intermediate files. Or a data compression method that is currently known or to be developed later may further be used to compress the two intermediate files to one data package.

In the embodiments of the present invention, it is not intended to limit where in the data package the first address and the second address are placed, but those skilled in the art may design a concrete implementation according to needs of an application environment. For example, the two addresses may be placed at the header, end or in the middle of the data package.

Specifically, it may be specified that the two addresses are placed at a designated location (for example, at the header) of the data package. At this point, when it is desired to recover the original first executable file and the second executable file from the processing result of the method according to an aspect of the present invention, the first address and the second address may be obtained from the header of the data package. Or special flags may be set for the first address and the second address, and by searching for the special flags, the first address and the second address may be found during the recovery.

For the sake of implementation, the first address and the second address may further be placed in the first intermediate file and the second intermediate file, respectively. In one embodiment of the present invention, there is further comprised: inserting the first address into the first intermediate file; and inserting the second address into the second intermediate file. Those skilled in the art may insert the addresses into the header, end or middle of the intermediate files so long as the two addresses can be found when the two executable files need to be recovered.

In one embodiment of the present invention, the inserting the first address into the first intermediate file comprises: inserting, at the first address, a first identifier that includes the first address; and the inserting the second address into the second intermediate file comprises: inserting, at the second address, a second identifier that includes the second address.

In this embodiment, the function in the first executable file may be replaced by a first identifier that includes the first address, and the function in the second executable file may be replaced by a second identifier that includes the second address. With this approach, the code section (for example, having dozens of kBs or even more) in the original executable file may be replaced by an identifier having several bytes. Therefore, the storage space for the processed result may be reduced greatly. In this embodiment, special flags may be set for the first identifier and the second identifier. During the recovery process, by searching for the special flags, the first identifier and the second identifier can be found, and further the first address and the second address obtained.

Figure 7:
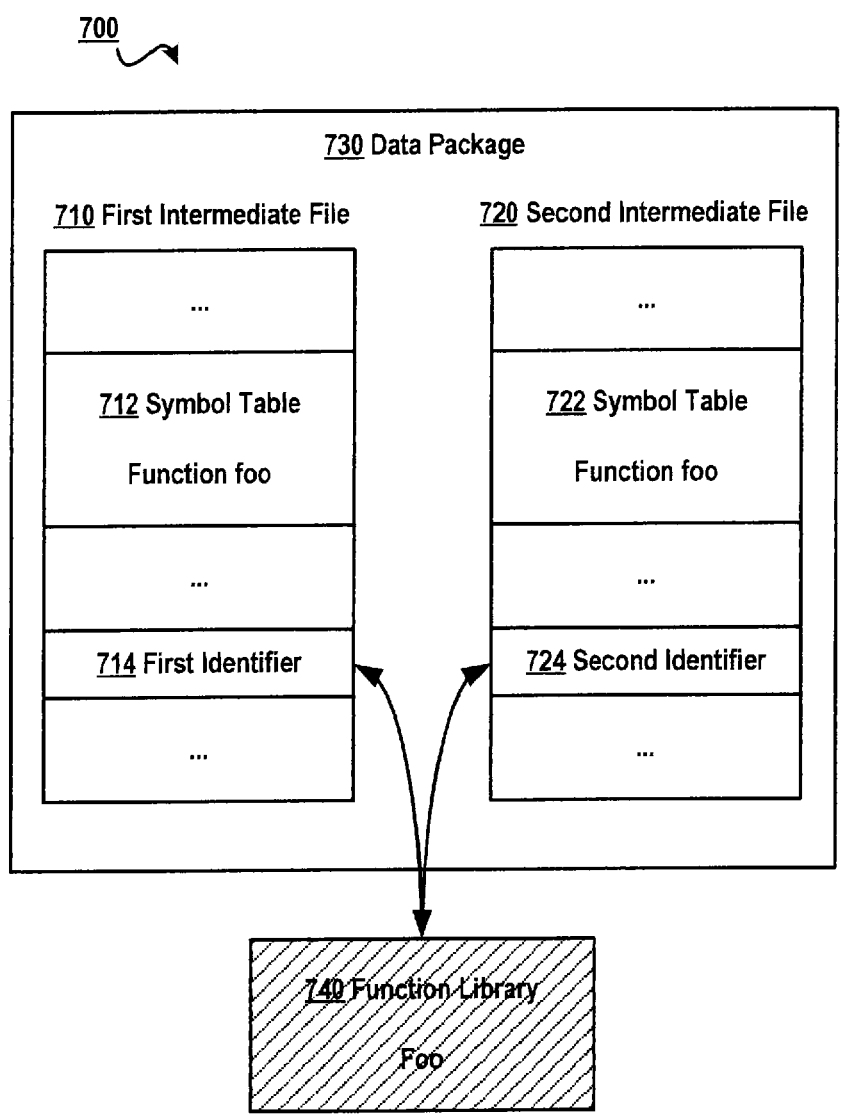
FIG. 7 schematically depicts a detailed block diagram of a processing result generated on the basis of a plurality of executable files according to one embodiment of the present invention.

FIG. 7 schematically shows a block diagram 700 of a processing result generated on the basis of a plurality of executable files according to one embodiment of the present invention. In this figure there is shown a processing result of executing the method of an aspect of the present invention with respect to first executable file 410 and second executable file 420 as shown in FIG. 4. Specifically, a data package 730 may comprise a first intermediate file 710 and a second intermediate file 720. First intermediate file 710 may comprise a symbol table 712 and a first identifier 714, and second intermediate file 720 may comprise a symbol table 722 and a second identifier 724, wherein first identifier 714 and second identifier 724 store respective addresses of the replaced function in the first executable file and the second executable file. As shown in FIG. 7, an association relationship may be built between data package 730 and a function library 740 through first identifier 714 and second identifier 724.

In one embodiment of the present invention, the determining that in a second executable file there exists a function that is the same as a function called in a first executable file comprises: comparing a first symbol table in the first executable file with a second symbol table in the second executable file; and in response to there existing the same function definition in the first symbol table and the second symbol table, determining that in the second executable file there exists a function that is the same as a function called in the first executable file.

Those skilled in the art may understand that the symbol table in an executable file may comprise information on functions called in this executable file. Therefore, by comparing whether the symbol tables in two executable files include the same function information, it may be determined whether the two executable files call the same function.

The data structure of a symbol table depends on a programming language used for programming and further depends on a running environment (such as the type of operating system) of an executable file. For example, formats of symbol tables in executable files generated on the Windows operating system and the Linux operating system may differ for executable file programs generated by source code that are written in the C language. Although formats of symbol tables depend on various factors, the symbol table usually comprises some key information, such as symbol name, type and virtual address.

In addition, when the executable file references different types of function libraries (such as dynamic function library, static function library), formats of symbol tables may also differ. Specifically, Table 1 schematically shows one example of static symbol tables, and Table 2 schematically shows one example of dynamic symbol tables.

TABLE 1

Example of Static Symbol Tables

| Symbol Name | Type | Virtual Address |
|---|---|---|
| foo | function | 0x08048094 |
| ... | ... | ... |

TABLE 2

Example of Dynamic Symbol Tables

| Symbol Name | Type | Virtual Address | Real Address | Library | Offset |
|---|---|---|---|---|---|
| printf | function | 0x08048094 | 0x00000000 | GLIBC 2.2.2.so | 0x0000ABCD |
| ... | ... | ... | ... | ... | ... |

Since the symbol table (static symbol table/dynamic symbol table) may comprise the definition of a data structure, in one embodiment of the present invention, processing may be performed only to entries in the symbol table for which the value of the field "type" is "function." By comparing values of the field "symbol name" with the type "function," it may be judged whether two executable files call the same function.

Specifically, suppose both static symbol tables of the first executable file and the second executable file are as shown in Table 1 (values of "virtual address" in the two symbol tables may differ), then it may be determined that the two executable files call the same static function foo. Suppose both dynamic symbol tables of the first executable file and the second executable file are as shown in Table 2 (values of "offset" in the two symbol tables may differ), then it may be determined that the two executable files call the same dynamic function printf.

In one embodiment of the present invention, the first address is retrieved from the first symbol table of the first executable file; and the second address is retrieved from the second symbol table of the second executable file. Since the first address is an address of the function in the first executable file and the second address is an address of the function in the second executable file, a corresponding address can be directly retrieved from the field "virtual address" in the symbol table. Those skilled in the art may retrieve the first address and the second address from corresponding symbol tables of the first executable file and the second executable file with reference to the data structures as shown in Table 1 and Table 2 above.

Those skilled in the art should understand that a static function and a dynamic function are called by different methods. Generally, an executable file calling a static function includes code for executing this static function, and an executable file calling a dynamic function does not include a code for executing the dynamic function but includes an entry that supports calling code of the dynamic function (for example, name of a dynamic library). Therefore, the static function and the dynamic function may be processed differently, which will be described in detail below.

In one embodiment of the present invention, the first symbol table and the second symbol table are static symbol tables, and the storing the function in relation to the data package comprises: retrieving a code section corresponding to the function from a static library including the function; and storing the code section in relation to the data package.

Figure 8A:
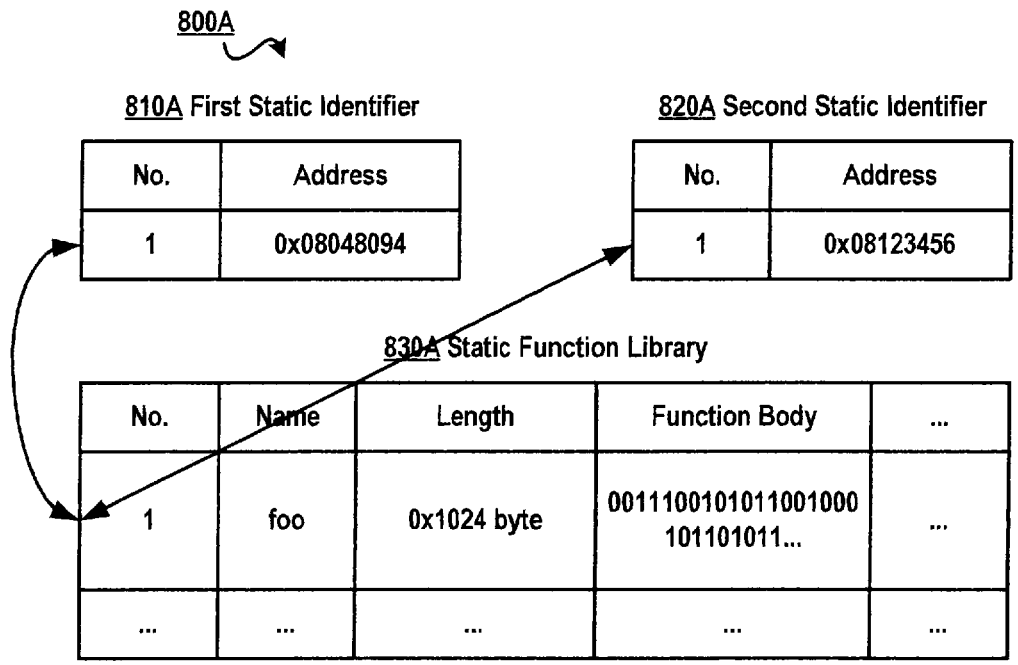
FIG. 8A schematically depicts a block diagram of data structures of static identifiers and a static function library according to one embodiment of the present invention.
Figure 8B:
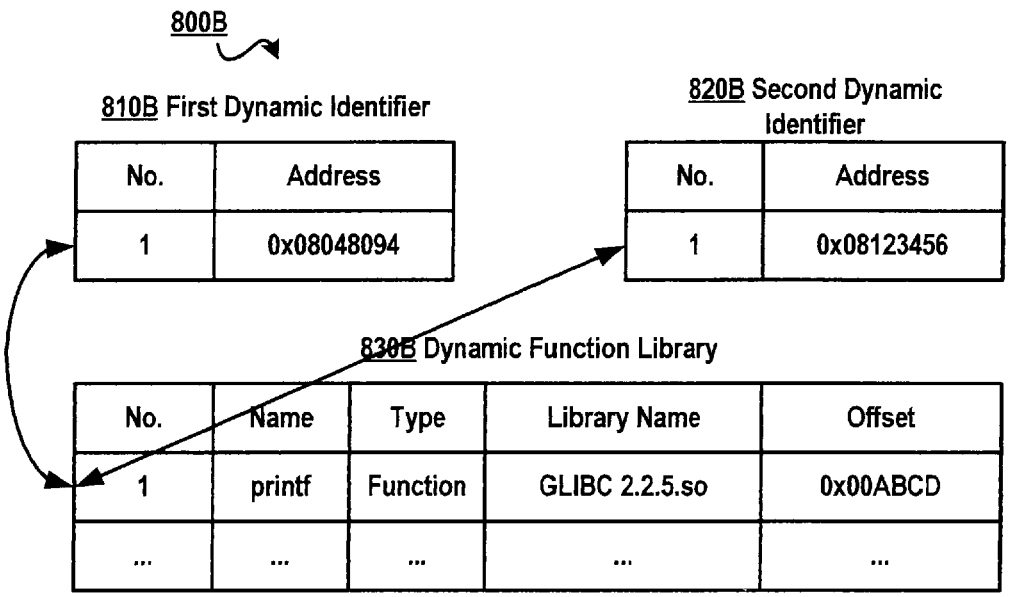
FIG. 8B schematically depicts a block diagram of data structures of dynamic identifiers and a dynamic function library according to one embodiment of the present invention.

Reference is made to FIGS. 8A and 8B. Specifically, FIG. 8A schematically shows a block diagram 800A of data structures of static identifiers and a static function library according to one embodiment of the present invention. As shown in FIG. 8A, a first static identifier 810A and a second static identifier 820A have been obtained on the basis of the above method. Both the first executable file and the second executable file call the same static function foo, and the function's first address in the first executable file is 0x08048094, and the function's address in the second executable file is 0x08123456.

According to one embodiment of the present invention, the function foo may be stored in a first entry of a static function library 830A. This entry may comprise a function name foo, length 0x1024 bytes, and a function body "001110010101100100010110101011 . . . ." In this manner, an association relationship may be built between identifiers (for example, first static identifier 810A and second static identifier 820A) and the function foo (as shown by arrows in FIG. 8A).

In one embodiment of the present invention, the first symbol table and the second symbol table are dynamic symbol tables, and the storing the function in relation to the data package comprises: retrieving an entry of a dynamic library calling the function; and storing the entry in relation to the data package.

FIG. 8B schematically shows a block diagram 800B of data structures of dynamic identifiers and a dynamic function library according to one embodiment of the present invention. As shown in FIG. 8B, a first dynamic identifier 810B and a second dynamic identifier 820B have been obtained on the basis of the above method. Both the first executable file and the second executable file call the same dynamic function printf, the function is included in a dynamic library "GLIBC 2.2.5.so," and the function's offset in the dynamic library is "0x00ABCD."

In this embodiment, the function printf may be stored in a first entry of a dynamic function library 830B. This entry may comprise a function name printf, type "function," a library name "GLIBC 2.2.5.so," and an offset "0x00ABCD." In this manner, an association relationship may be built between identifiers (for example, first dynamic identifier 810B and second dynamic identifier 820B) and the function printf (as shown by arrows in FIG. 8B).

It is appreciated that, although FIG. 8A and FIG. 8B respectively show a circumstance where a static function and a dynamic function are called separately, the executable files may simultaneously call a static function and a dynamic function.

In one embodiment of the present invention, the storing the function in relation to the data package comprises: attaching the function to an end or header of the data package. In order to simplify operations, the function may further be attached to the end or header of the data package, so as to be stored with the data package as one data block. In this manner, it is more convenient to store and transmit a processing result of executing a technical solution of an aspect of the present invention to a plurality of executable files.

Those skilled in the art should understand since there exists differences between contents of code sections of executable files that support different operating systems, the method of an aspect of the present invention is to be performed to executable files that support the same operating system.

In one embodiment of an aspect of the present invention, when there is a need to process a plurality of executable files, the plurality of executable files may be divided into different groups according to running environments of the plurality of executable files. Specifically, when managing many executable files that support Windows and Linux operating systems respectively, these executable files may be divided into two groups on the basis of types of operating systems, and the method of an aspect of the present invention is executed with respect to executable files in each group.

Those skilled in the art should understand since contents of code sections in executable files that are associated with different programming languages differ, the method of an aspect of the present invention is to be performed to executable files that are associated with the same programming languages.

In one embodiment of the present invention, when there is a need to process a plurality of executable files, these executable files may be divided into different groups on the basis of programming languages. Specifically, when processing a large amount of executable files associated with the C language and the Java language respectively, these executable files may be divided into two groups on the basis of programming languages, and the method of an aspect of the present invention is executed with respect to executable files in each group.

In one embodiment of the present invention, the above methods for dividing on the basis of operating systems and programming languages may be combined.

A detailed description has been presented above of a method for managing a plurality of executable files. By considering that the plurality of executable files contain the same data section, the method can generate a processing result on the basis of the plurality of executable files and only save one copy of the same data section in the processing result. In this manner, the storage space occupied by the plurality of executable files can be reduced, and further the transmission efficiency of transmitting the plurality of executable files can further be enhanced.

Hereinafter, the detailed description is presented as to how to recover original executable files from a processing result of using a method of an aspect of the present invention. In one embodiment of the present invention, there is provided a method for managing executable files, comprising: in response to receiving a data package, retrieving a function associated with the data package; extracting from the data package a first part of a first executable file and a second part of a second executable file; and inserting the function to a first address in the first part so as to recover the first executable file, and inserting the function to a second address in the second part so as to recover the second executable file, wherein the data package is a data package in a method according to an aspect of the present invention.

Figure 9:
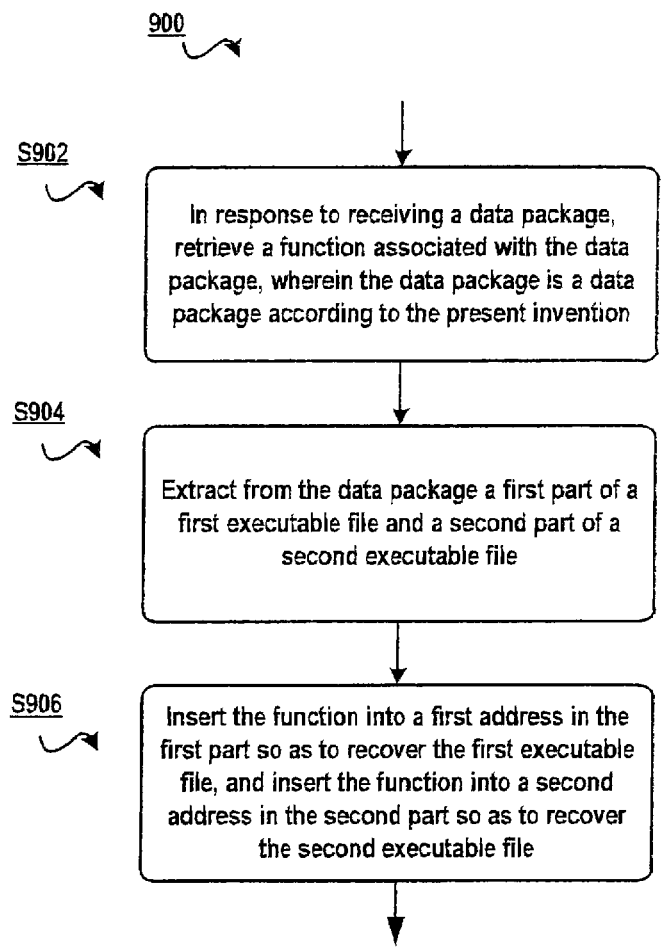
FIG. 9 schematically depicts a flowchart of a method for managing executable files according to one embodiment of the present invention.

Specifically, FIG. 9 schematically shows a flowchart 900 of a method for managing executable files according to one embodiment of the present invention. The method as shown in FIG. 9 may be a reverse treatment of the method as shown in FIG. 6. Specifically, in step S902, in response to receiving a data package, a function associated with the data package is retrieved, wherein the data package is a data package in the method according to an aspect of the present invention. Since the function is stored in relation to the data package, the function may be retrieved on the basis of an association relationship therebetween. Specifically, when the function is attached to the end of the data package, the function may directly be detached from the end of the data package.

In step S904, a first part of a first executable file and a second part of a second executable file are extracted from the data package. Those skilled in the art may extract the first part and the second part with reference to a step reverse to step S604 in FIG. 6. The first part in this step is a part other than the function in the first executable file in the above method, and the second part is a part other than the function in the second executable file in the above method.

In step S906, the function is inserted into a first address in the first part so as to recover the first executable file, and the function is inserted into a second address in the second part so as to recover the second executable file. In this manner, the original first executable file and second executable file can be recovered from a result generated according to the steps as shown in FIG. 6.

Various embodiments implementing a method of an aspect of the present invention have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided an apparatus based on the same invention concept. Even if the apparatus has the same hardware structure as a general-purpose processing device, the functionality of software contained therein makes the apparatus manifest distinguishing properties from the general-purpose processing device, thereby forming an apparatus of the various embodiments of aspects of the present invention. The apparatus described in an aspect of the present invention comprises several means or modules, the means or modules configured to execute corresponding steps. Upon reading this specification, those skilled in the art may understand how to write a program for implementing actions performed by these means or modules. Since the apparatus is based on the same inventive concept as the method, the same or corresponding implementation details are also applicable to means or modules corresponding to the method. As a detailed and complete description has been presented above, the apparatus is not detailed below.

Figure 10A:
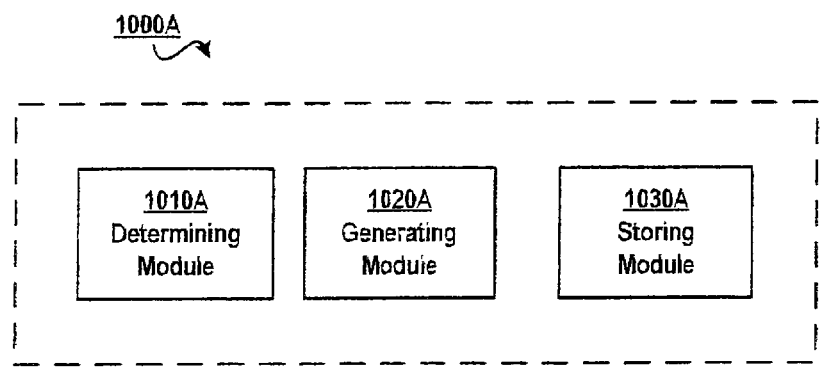
FIG. 10A schematically depicts a block diagram of an apparatus for managing executable files according to one embodiment of the present invention.

FIG. 10A schematically shows a block diagram 1000A of an apparatus for managing executable files according to one embodiment of the present invention. Specifically, there is provided an apparatus for managing executable files, comprising: a determining module 1010A configured to determine that in a second executable file there exists a function that is the same as a function called in a first executable file; a generating module 1020A configured to generate a data package on a portion other than the function in the first executable file and the second executable file; and a storing module 1030A configured to store the function in relation to the data package, wherein the data package comprises a first address of the function in the first executable file and a second address of the function in the second executable file.

In one embodiment of the present invention, generating module 1020A comprises: a removing module configured to remove the function from the first address of the first executable file so as to generate a first intermediate file, and remove the function from the second address of the second executable file so as to generate a second intermediate file; and a data package generating module configured to generate the data package on the basis of the first intermediate file and the second intermediate file.

In one embodiment of the present invention, there are further comprised: a first inserting module configured to insert the first address into the first intermediate file; and a second inserting module configured to insert the second address into the second intermediate file.

In one embodiment of the present invention, the first inserting module is further configured to insert, at the first address, a first identifier that includes the first address; and the second inserting module is further configured to insert, at the second address, a second identifier that includes the second address.

In one embodiment of the present invention, determining module 1010A comprises: a comparing module configured to compare a first symbol table in the first executable file with a second symbol table in the second executable file; and a deciding module configured to, in response to there existing the same function definition in the first symbol table and the second symbol table, determine that in the second executable file there exists a function that is the same as a function called in the first executable file.

In one embodiment of the present invention, the first address is retrieved from the first symbol table of the first executable file; and the second address is retrieved from the second symbol table of the second executable file.

In one embodiment of the present invention, the first symbol table and the second symbol table are static symbol tables, and storing module 1030A comprises: a static retrieving module configured to retrieve a code section corresponding to the function from a static library including the function; and a static storing module configured to store the code section in relation to the data package.

In one embodiment of the present invention, the first symbol table and the second symbol table are dynamic symbol tables, and storing module 1030A comprises: a dynamic retrieving module configured to retrieve an entry of a dynamic library calling the function; and a dynamic storing module configured to store the entry in relation to the data package.

In one embodiment of the present invention, storing module 1030A comprises: an attaching module configured to attach the function to the end or header of the data package.

Figure 10B:
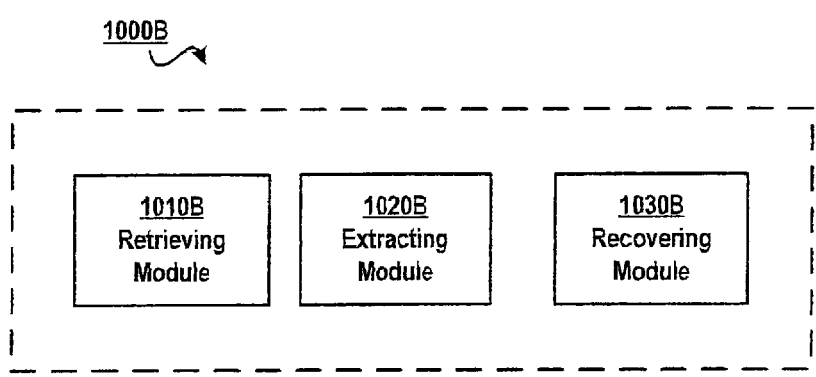
FIG. 10B schematically depicts a block diagram of an apparatus for managing executable files according to one embodiment of the present invention.

FIG. 10B schematically shows a block diagram 1000B of an apparatus for managing executable files according to one embodiment of the present invention. Specifically, there is provided an apparatus for managing executable files, comprising: a retrieving module 1010B configured to, in response to receiving a data package, retrieve a function associated with the data package; an extracting module 1020B configured to extract from the data package a first part of a first executable file and a second part of a second executable file; and a recovering module 1030B configured to insert the function into a first address in the first part so as to recover the first executable file, and insert the function into a second address in the second part so as to recover the second executable file, wherein the data package is a data package in a method according to an aspect of the present invention.

By means of the methods and apparatuses of aspects of the present invention, the storage space occupied by a plurality of executable files can be reduced, and moreover the plurality of executable files can be recovered where it is necessary.

As described herein, in one embodiment of the present invention, there is provided a method for managing executable files, comprising: determining that in a second executable file there exists a function that is the same as a function called in a first executable file; generating a data package on a portion other than the function in the first executable file and the second executable file; and storing the function in relation to the data packet, wherein the data package comprises a first address of the function in the first executable file and a second address of the function in the second executable file.

In one embodiment of the present invention, there is provided a method for managing executable files, comprising: in response to receiving a data package, retrieving a function associated with the data package; extracting from the data package a first part of a first executable file and a second part of a second executable file; and inserting the function into a first address in the first part so as to recover the first executable file, and inserting the function into a second address in the second part so as to recover the second executable file, wherein the data package is a data package in the method according to an aspect of the present invention.

In one embodiment of the present invention, there is provided an apparatus for managing executable files, comprising: a determining module configured to determine that in a second executable file there exists a function that is the same as a function called in a first executable file; a generating module configured to generate a data package on a portion other than the function in the first executable file and the second executable file; and a storing module configured to store the function in relation to the data packet, wherein the data package comprises a first address of the function in the first executable file and a second address of the function in the second executable file.

In one embodiment of the present invention, there is provided an apparatus for managing executable files, comprising: a retrieving module configured to, in response to receiving a data package, retrieve a function associated with the data package; an extracting module configured to extract from the data package a first part of a first executable file and a second part of a second executable file; and a recovering module configured to insert the function into a first address in the first part so as to recover the first executable file, and insert the function into a second address in the second part so as to recover the second executable file, wherein the data package is a data package in the apparatus according to an aspect of the present invention.

By means of the methods and apparatuses of aspects of the present invention, by considering the same data section that exists between a plurality of executable files, a new file may be generated on the basis of the plurality of executable files and only one copy of the same data section is saved in this file. In this manner, the storage space occupied by the plurality of executable files can be reduced; while transmitting data, the transmission efficiency of transmitting the plurality of executable files can further be increased.

Aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable file instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing executable files, the method comprising:
    determining, by a processor, that a first executable file includes a function and that a second executable file includes the same function as the first executable file, wherein the determining comprises comparing a first symbol table in the first executable file with a second symbol table in the second executable file;
    generating a data package on a portion other than the function in the first executable file and the second executable file, wherein the data package comprises a first address of the function in the first executable file and a second address of the function in the second executable file, wherein the first address is retrieved from the first symbol table of the first executable file, and the second address is retrieved from the second symbol table of the second executable file;
    compressing, by the processor, the data package at a ratio higher than respective compression ratios for both the first executable file and the second executable file, based on the determining that the second executable file includes the same function as the first executable file and excluding the first executable file and the second executable file from the data package; and
    storing the function, wherein the function is accessible by the data package, and wherein use of the first address and the second address enables respective recoveries of both the first executable file and the second executable file based on the data package and the stored function, wherein the receptive recoveries comprise:
        extracting a first part of the first executable file and a second part of the second executable file from the data package;
        inserting the function into the first address in the first part to recover the first executable file; and
        inserting the function into the second address in the second part to recover the second executable file.

2. The method according to claim 1, wherein the generating the data package on the portion other than the function in the first executable file and the second executable file comprises:

removing the function from the first address of the first executable file so as to generate a first intermediate file, and removing the function from the second address of the second executable file so as to generate a second intermediate file; and generating the data package on the basis of the first intermediate file and the second intermediate file.

3. The method according to claim 2, further comprising:
inserting the first address into the first intermediate file; inserting the second address into the second intermediate file; and compressing at least one of the first intermediate file and the second intermediate file, prior to generating the data package.

4. The method according to claim 2, further comprising:
inserting, at the first address, a first identifier that includes the first address; and
inserting, at the second address, a second identifier that includes the second address.

5. The method according to claim 1, wherein the determining further comprises:
ascertaining that a definition corresponding to the function appears in both the first symbol table and the second symbol table.

6. The method according to claim 5, wherein the first symbol table and the second symbol table are respective static symbol tables, and the storing the function comprises:
retrieving a code section corresponding to the function from a static library including the function; and
storing the retrieved code section as being referenced from the data package.

7. The method according to claim 5, wherein the first symbol table and the second symbol table are respective dynamic symbol tables, and the storing the function comprises:
retrieving an entry of a dynamic library identified by a name of the function; and
storing the retrieved entry as being referenced from the data package, wherein the entry identified by the name comprises a library name and an offset of the entry such that the function is locatable by use of the library name and the offset.

8. The method according to claim 1, wherein the storing the function comprises:
attaching the function to the data package; and
based on the attaching, storing and transmitting the data package and the function as one data block.

9. The method according to claim 1, further comprising:
based on receiving the data package, performing the receptive recoveries.

10. A computer system for managing executable files, the computer system comprising: a memory; and
a processor in communication with the memory, wherein the computer system is configured to perform a method, said method comprising:
determining, by the processor, that a first executable file includes a function and that a second executable file includes the same function as the first executable file, wherein the determining comprises comparing a first symbol table in the first executable file with a second symbol table in the second executable file;
generating a data package on a portion other than the function in the first executable file and the second executable file, wherein the data package comprises a first address of the function in the first executable file and a second address of the function in the second executable file, wherein the first address is retrieved from the first symbol table of the first executable file, and the second address is retrieved from the second symbol table of the second executable file;
compressing, by the processor, the data package at a ratio higher than respective compression ratios for both the first executable file and the second executable file, based on the determining that the second executable file includes the same function as the first executable file and excluding the first executable file and the second executable file from the data package; and
storing the function, wherein the function is accessible by the data package, and wherein use of the first address and the second address enables respective recoveries of both the first executable file and the second executable file based on the data package and the stored function, wherein the receptive recoveries comprise:
extracting a first part of the first executable file and a second part of the second executable file from the data package;
inserting the function into the first address in the first part to recover the first executable file; and
inserting the function into the second address in the second part to recover the second executable file.

11. The computer system according to claim 10, wherein the generating the data package on the portion other than the function in the first executable file and the second executable file comprises:
removing the function from the first address of the first executable file so as to generate a first intermediate file, and removing the function from the second address of the second executable file so as to generate a second intermediate file; and
generating the data package on the basis of the first intermediate file and the second intermediate file.

12. The computer system according to claim 11, further comprising:
inserting the first address into the first intermediate file; inserting the second address into the second intermediate file; and
compressing at least one of the first intermediate file and the second intermediate file, prior to generating the data package.

13. The computer system according to claim 10, wherein the determining further comprises:
ascertaining that a definition corresponding to the function appears In both the first symbol table and the second symbol table.

14. The computer system according to claim 10, wherein the method further comprises:
based on receiving the data package, performing the receptive recoveries.

15. A computer program product for managing executable files, the computer program product comprising:
a computer readable storage medium readable by a processing circuit and storing instructions for execution by the processing circuit for performing a method comprising:
determining, by a processor, that a first executable file includes a function and that a second executable file includes the same function as the first executable file, wherein the determining comprises comparing a first symbol table in the first executable file with a second symbol table in the second executable file;
generating a data package on a portion other than the function in the first executable file and the second executable file, wherein the data package comprises a first address of the function in the first executable file and a second address of the function in the second executable file, wherein the first address is retrieved from the first symbol table of the first executable file, and the second address is retrieved from the second symbol table of the second executable file;

compressing, by the processor, the data package at a ratio higher than respective compression ratios for both the first executable file and the second executable file, based on the determining that the second executable file includes the same function as the first executable file and excluding the first executable file and the second executable file from the data package; and storing the function, wherein the function is accessible by the data package, and wherein use of the first address and the second address enables respective recoveries of both the first executable file and the second executable file based on the data package and the stored function, wherein the receptive recoveries comprise:

extracting a first part of the first executable file and a second part of the second executable file from the data package;

inserting the function into the first address in the first part to recover the first executable file; and inserting the function into the second address in the second part to recover the second executable file.

16. The computer program product according to claim 15, wherein the generating the data package on the portion other than the function in the first executable file and the second executable file comprises:

removing the function from the first address of the first executable file so as to generate a first intermediate file, and removing the function from the second address of the second executable file so as to generate a second intermediate file; and generating the data package on the basis of the first intermediate file and the second intermediate file.

17. The computer program product according to claim 16, further comprising:

inserting the first address into the first intermediate file;

inserting the second address into the second intermediate file; and compressing at least one of the first intermediate file and the second intermediate file, prior to generating the data package.

18. The computer program product according to claim 15, wherein the determining further comprises:

ascertaining that a definition corresponding to the function appears in both the first symbol table and the second symbol table.

19. The computer program product according to claim 15, wherein the method further comprises:

based on receiving the data package, performing the receptive recoveries.

\* \* \* \* \*